Feb. 1, 1955     D. C. PEROUTKY ET AL     2,701,324
AIR-COOLED ELECTRIC SPARK IGNITER
Filed May 11, 1951
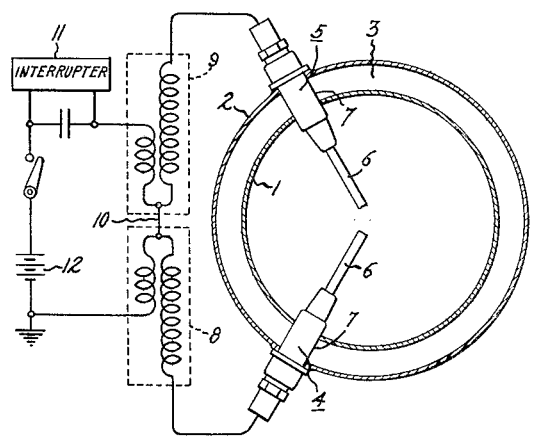
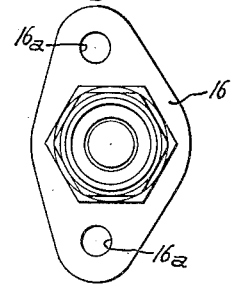
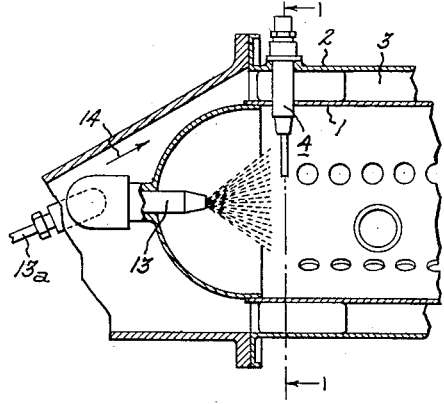
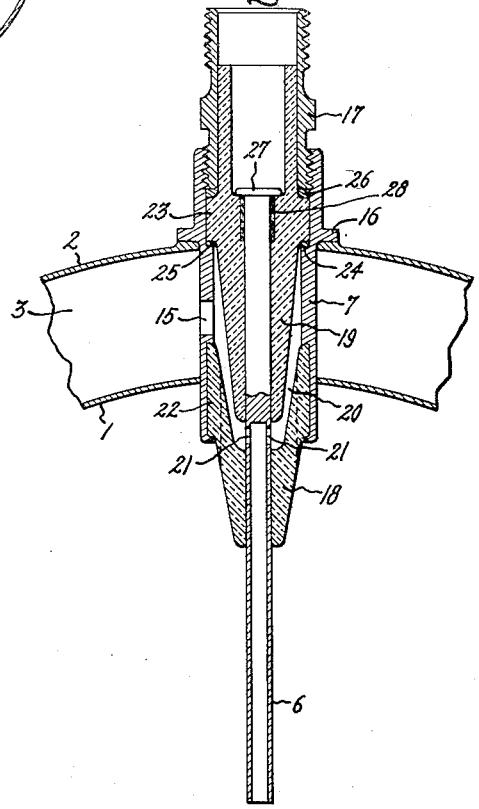
Inventors:
Donald C. Peroutky,
Clarence J. Watters,
by *Clark A. Mott*
Their Attorney.

United States Patent Office 2,701,324
Patented Feb. 1, 1955

2,701,324

AIR-COOLED ELECTRIC SPARK IGNITER

Donald C. Peroutky and Clarence J. Watters, Schenectady, N. Y., assignors to General Electric Company, a corporation of New York Application May 11, 1951, Serial No. 225,778

9 Claims. (Cl. 317—83)

Our invention relates to electric spark igniters, and more particularly to air-cooled electric spark igniters, or spark plugs, of the single insulated electrode type.

The invention is especially adapted for use in conjunction with spark plugs intended to be disposed in high temperature combustion chambers, such as the combustion chambers of gas turbine power plants, rocket or reaction type motors, or the like.

Heretofore, power plants of the foregoing types have been subjected to certain limitations in respect to permissible power rating, operating temperatures, overhaul intervals, and the like because of the inability of igniting devices to withstand the exceedingly high operating temperatures and other extreme conditions to which it is desirable that they be subjected. Particularly, it has heretofore been found impossible, due to spark plug temperature limitations, to locate the igniting devices in the most favorable location to obtain optimum starting characteristics under high altitude and high air speed conditions.

Accordingly, therefore, it is a general object of our invention to provide a new and improved air-cooled electric spark igniter.

It is a more particular object of our invention to provide a new and improved air-cooled electric spark igniter, or spark plug, of the single insulated electrode type.

It is still another object of our invention to provide a new and improved arrangement for air cooling the high potential electrode of an electric spark igniter.

It is still another object of our invention to provide a new and improved electric spark igniter having a central air-cooled high potential electrode not subject to flashover or short circuiting by reason of the deposition of carbon or other unburned combustion products.

In carrying out our invention in one form, we mount an elongated hollow, or tubular, high potential electrode concentrically within a grounded tubular metallic shell by means of a pair of telescoped tubular insulating members, the insulators being positioned to provide between them a radial air passageway axially offset to provide a surface flashover, or leakage, path appreciably longer than the minimum spacing between the electrode and shell. Both the electrode and shell are provided with apertures in their side walls communicating with opposite ends of the radial air passageway, whereby cooling air is led through the passageway to the interior of the hollow high potential electrode.

Our invention itself will be more fully understood and its various objects and advantages further appreciated by referring now to the following detailed specification, taken in conjunction with the accompanying drawing, in which Fig. 1 is a schematic circuit diagram of an opposite polarity ignition system utilizing two single electrode plugs mounted in a combustion chamber; Fig. 2 is a fragmentary cross-sectional view of a gas turbine power plant illustrating a preferred application of spark plugs embodying our invention; Fig. 3 is an axial cross-sectional view of a single electrode spark plug embodying our invention in a preferred form; and Fig. 4 is a plan view of the plug shown at Fig. 3.

Referring now to the drawing, and particularly to Fig. 1, we have there illustrated in transverse cross-sectional view a cylindrical combustion chamber 1 concentrically positioned within an outer casing or "air adapter" 2 to form therebetween an air duct 3. A pair of single electrode spark plugs 4 and 5 are approximately radially positioned in the air duct and include sparking electrodes 6 which project into the combustion chamber 1 with their ends in juxtaposition. Each plug 4 and 5 also includes a shell 7 which extends through the air duct 3 to provide an electric terminal connection on the outer side of the air adapter 2. The plugs 4 and 5 are connected to opposite polarity high voltage terminals of the secondary windings of a pair of ignition transformers 8 and 9, the primary windings and secondary windings of which are each connected in series circuit relation through a common center connection 10. The primary windings of the transformers 8 and 9 are connected in series circuit relation with an interrupter 11 to a suitable source of direct electric current supply, shown as a battery 12.

The opposite polarity ignition system briefly described above and illustrated at Fig. 1 is more fully described and claimed in the copending application of Elmer W. Lautenberger, Serial No. 172,337, filed July 6, 1950, now Patent No. 2,590,778 for Dual-Plug Ignition System, and assigned to the same assignee as the subject application.

The positioning of the spark plug 4 within the combustion chamber 1 and the adjacent air duct 3 is shown in axial cross-sectional view at Fig. 2. At this figure, we have shown a fragmentary cross-sectional view of a gas turbine power plant including the combustion chamber 1, the air adapter 2, and a fuel supply nozzle 13. The nozzle 13 is supplied with suitable fuel, such as oil, through an inlet conduit 13a, and is arranged to spray fuel under pressure into the combustion chamber. It will be readily understood by those skilled in the art that a suitable compressor (not shown) is provided to supply air through the duct 3 in the direction indicated by the arrow 14. For the purpose of illustration only, the combustion apparatus shown at Fig. 2 has been shown as similar to that disclosed and claimed in the copending application of Anthony J. Nerad, Serial No. 750,015, filed May 23, 1947, now Patent No. 2,601,000, and assigned to the same assignee as the subject application. It will, of course, be evident to those skilled in the art that our invention is equally applicable to other types of combustion apparatus.

Referring now more particularly to Fig. 3, we have shown an axial cross-sectional view of a spark plug embodying our invention and mounted in the combustion chamber 1 and air adapter 2 as at Fig. 1. As shown at Fig. 3, the shell 7 is tubular and is provided with an aperture 15 in one side wall, the aperture being positioned within the air duct 3 and facing upstream when the plug is in operative position. At its upper end, the tubular metallic shell 7 is provided with an external annular mounting flange 16, and is internally threaded to receive a metallic clamping sleeve 17 which is further described hereinafter. As shown at Fig. 4, the mounting flange 16 is provided with offset bolt holes 16a to insure proper orientation of the shell aperture 15 within the air duct.

Within the open lower end of the tubular shell member 7, there is fixedly mounted, as by spinning over the end of the shell, a conical ceramic insulator 18 having a central bore within which is positioned the central electrode 6. The electrode 6 is a hollow tubular metallic member mounted within the shell 7 upon a second centrally bored, or tubular, ceramic insulator 19, the electrode extending through the insulator 18 and beyond the ends of the shell 7 and insulator 18 into the combustion chamber. The conical outer end of the insulator 18 projects beyond the end of the shell 7, and the inner end of the insulator 18 is conically recessed to receive within it the conical end of the insulator 19. The thus nested or telescoped insulators 18 and 19 are axially spaced apart to form between them an annular air passageway 20 which is axially offset, thereby to provide a surface leakage path between the high potential electrode 6 and the grounded shell 7 which is appreciably longer than the minimum radial spacing between the electrode and shell. The annular air passageway 20 communicates at its outer end with the aperture 15 in the shell 7, and at its inner end the passageway 20 communicates with a pair of apertures 21 in the side walls of the tubular electrode 6, the apertures 21 thus being axially offset with respect to the shell aperture 15.

The outer periphery of the insulator 18 is serrated axially at 22 in the region where it contacts the inner surface of the tubular shell 7, thereby to provide a plurality of axial air passageways between the shell and the insulator 18 which communicate at one end with the annular air passageway 20 and open at their opposite ends into the combustion chamber 1. It will be evident to those skilled in the art that such axial passageways may be otherwise formed, as by serrating the inner surface of the shell 7 and not the insulator.

The upper ceramic insulator 19 is provided in the region of its center with an annular flange 23 which is seated upon an internal shoulder 24 in the shell 7. The insulator 19 is held in position in the shell 7 and against the shoulder 24 by the clamping sleeve 17 which seats at its lower end against the upper side of the insulator flange 23. Preferably gas seals in the form of copper washers 25 and 26 are positioned on opposite sides of the insulator flange 23.

At its upper end, the insulator 19 is provided with an enlarged central bore providing a shoulder upon which is seated a flange or lip 27 at the upper end of the tubular electrode 6. Electric connection is made to the upper end of the electrode through the enlarged bore at the upper end of the insulator 19. Preferably the electrode 6 is fixedly connected to the insulator 19 and a gas seal is provided therebetween by means of a suitable solder, cement or other adhesive between the electrode and the insulator 19 immediately below the lip 27.

It will now be evident to those skilled in the art that in operation, air under pressure from the duct 3 is supplied through the shell aperture 15 and through the offset annular air passageway 20 and the apertures 21 to the interior of the tubular electrode 6. The cooling air then passes through the projecting end of the electrode 6 and into the combustion chamber. At the same time, air from the annular air passageway 20 is supplied through the axial air passageways 22 and along the sides of the insulator 18, thereby to aid in cooling the insulator. Because of the offset configuration of the air passageway 20, the surface leakage path between the electrode 6 and the shell 7, which is normally grounded, is of such length that our improved spark plug is not subject to flashover or short circuiting by reason of deposition of unburned fuel or combustion products upon the insulator surfaces. Moreover, the plug is readily cleaned by removing the clamping sleeve 17 and withdrawing the insulator 19 and connected electrode 6. After such simple disassembly, the insulator surfaces forming the annular air passageway 20 may be wiped clean.

While we have described only a preferred embodiment of our invention by way of illustration, many modifications will occur to those skilled in the art and we therefore wish to have it understood that we intend in the appended claims to cover all such modifications as fall within the true spirit and scope of our invention.

What we claim as new and desire to secure by Letters Patent of the United States is:

1. In a single electrode electric spark igniter adapted to project through a combustion chamber wall and into an air duct adjacent said wall, a tubular metallic shell having an aperture in a side wall thereof and adapted for disposition in said duct, an insulating support mounted within said shell and projecting beyond one end thereof, said insulating support being formed within said shell to provide an air passageway communicating at one end with said shell aperture, and a tubular high potential electrode carried by said insulating support in spaced relation with said shell and having an open end extending beyond the projecting end of said insulating support, said electrode having an aperture in one side wall thereof communicating with the other end of said passageway and said passageway providing a minimum surface leakage path appreciably longer than the minimum spacing between said electrode and shell.

2. In a single electrode electric spark igniter adapted to project through a combustion chamber wall and into an air duct adjacent said wall, a tubular metallic shell having an aperture in a side wall thereof and adapted for disposition in said duct, a tubular insulating support mounted within said shell and projecting beyond one end thereof, said insulating support being formed within said shell to provide a radial air passageway communicating at its outer end with said shell aperture, and a tubular high potential electrode carried by said insulating support in concentric spaced relation with said shell and having an open end extending beyond the projecting end of said insulating support, said electrode having an aperture in one side wall thereof axially offset from said shell aperture and communicating with the inner end of said air passageway whereby said air passageway provides a surface leakage path appreciably longer than the minimum spacing between said electrode and shell.

3. In a single electrode electric spark igniter adapted to project through a combustion chamber wall and into an air duct adjacent said wall, a tubular metallic shell having an aperture in one side wall thereof and adapted for disposition in said duct, a pair of tubular insulating members mounted within said shell in spaced apart telescoping relation thereby to provide an axially offset annular air passageway therebetween, one of said insulating members projecting beyond one end of said shell, said air passageway communicating at its outer end with said shell aperture, and a tubular high potential electrode carried by said insulating members in concentric spaced relation with said shell, said electrode having an open end extending beyond the projecting end of said one insulating member and having an aperture in a side wall thereof axially offset from said shell aperture and between said insulating members, whereby said air passageway provides a surface leakage path between said shell and electrode appreciably longer than the minimum radial spacing therebetween.

4. In a single electrode electric spark igniter adapted to project through a combustion chamber wall and into an air duct adjacent said wall, a tubular metallic shell having an aperture in one side wall thereof and adapted for disposition in said duct, a pair of conical insulating members mounted within said shell in axially spaced apart nested relation thereby to provide an axially offset annular air passageway therebetween, one said insulating member projecting beyond one open end of said shell and being formed to provide at least one axial air passageway therebetween communicating at one end with said annular air passageway, said annular air passageway communicating at its outer end with said shell aperture, and a tubular high potential electrode centrally mounted in said insulating members in concentric spaced relation with said shell, said electrode having an open end projecting beyond said one insulating member and having an aperture in a side wall thereof axially offset from said shell aperture and between said insulating members, whereby said air passageway provides a surface leakage path between said shell and electrode appreciably longer than the minimum radial spacing therebetween.

5. In a single electrode electric spark igniter adapted to project through a combustion chamber wall and into an air duct adjacent said wall, a tubular metallic shell having an aperture in a side wall thereof and adapted for disposition in said duct, a tubular insulating support mounted within said shell and projecting beyond one end thereof, said insulating support being formed to provide a radial air passageway communicating at its outer end with said shell aperture and at least one axial air passageway between said shell and support connecting said radial passageway with an open end of said shell, and a tubular high potential electrode carried by said insulating support in concentric spaced relation with said shell and having an open end extending beyond said projecting end of said insulating support, said electrode having an aperture in one side wall thereof axially offset from said shell aperture and communicating with the inner end of said radial passageway whereby said radial passageway provides a surface leakage path appreciably longer than the minimum spacing between said electrode and shell.

6. An igniter unit comprising a metal shell having an opening therein, an upper insulator and a lower insulator in said shell, each of said insulators having a bore therethrough, a passage between said upper and said lower insulators adjacent said opening, a tubular electrode sealed into the bore of said upper insulator and extending through the bore of said lower insulator, said electrode having an opening in one wall thereof adjacent said passage to allow air to circulate into said electrode, and means for mounting said unit.

7. An igniter unit comprising a metal shell having upper and lower openings therein, upper and lower insulators having vertically aligned centerbores mounted in said shell, said upper insulator extending into the center bore of said lower insulator, an annular passage between said upper insulator and said lower insulator adjacent the upper opening in said shell, a tubular electrode sealed into the centerbore of said upper insulator and extending concentrically through the centerbore of said lower insulator, said electrode having an air passage in the wall thereof adjacent said first mentioned passage, said upper opening allowing air to circulate past said upper insulator and through said electrode and said lower opening allowing air to circulate past said lower insulator to cool said unit.

8. An igniter comprising a pair of units, each of said units including a metal shell, upper and lower centerbored insulators in said shell, said upper insulator extending into the centerbore of said lower insulator and leaving a passage between said upper and said lower insulators for the circulation of air, a hollow electrode mounted in the centerbores of said insulators, said electrode having an opening adjacent said passage to allow cooling air to circulate through said electrode and an opening in said shell adjacent said passage to allow the entrance of air to said passage, said units being mounted in spaced relationship to provide a spark gap between the electrode of one of said units and the electrode of the other of said units.

9. An igniter comprising a pair of units, each of said units including a metal shell, upper and lower centerbored insulators in said shell, said upper insulator extending into the centerbore of said lower insulator and leaving a passage between said upper and said lower insulators for the circulation of air, a hollow electrode mounted in the centerbores of said insulators, said electrode having an opening adjacent said passage to allow cooling air to circulate through said electrode, an upper opening in said shell adjacent said passage to allow air to circulate past said upper insulator and into said passage, and a lower opening in said shell to allow air to circulate past said lower insulator, said units being separately mounted in spaced relationship to provide a spark gap between the electrode of one of said units and the electrode of the other of said units.

References Cited in the file of this patent

UNITED STATES PATENTS

| | | |
|---|---|---|
| 2,459,286 | Rabezzana et al. | Jan. 18, 1949 |
| 2,493,743 | Benson | Jan. 10, 1950 |
| 2,526,169 | Steeg | Oct. 17, 1950 |